United States Patent
Galli

(10) Patent No.: US 6,796,674 B2
(45) Date of Patent: Sep. 28, 2004

(54) FLASHLIGHT HEAD WITH ISOLATED LIGHTING ELEMENTS

(76) Inventor: Robert Galli, 8176 Horseshoe Bend La., Las Vegas, NV (US) 89113

(*) Notice: Subject to any disclaimer, the term of this patent is extended or adjusted under 35 U.S.C. 154(b) by 3 days.

(21) Appl. No.: 10/374,814

(22) Filed: Feb. 25, 2003

(65) Prior Publication Data

US 2004/0165378 A1 Aug. 26, 2004

(51) Int. Cl.⁷ .................................................. F21L 4/02
(52) U.S. Cl. ........................ 362/184; 362/202; 362/800
(58) Field of Search ................................ 362/184, 227, 362/241, 247, 800, 203, 208

(56) References Cited

U.S. PATENT DOCUMENTS

| | | | |
|---|---|---|---|
| 4,152,624 A | * 5/1979 | Knaebel | 313/499 |
| 5,081,568 A | 1/1992 | Dong et al. | |
| 5,400,229 A | * 3/1995 | Lin | 362/249 |
| 5,408,393 A | 4/1995 | Becker | |
| 5,580,156 A | 12/1996 | Suzuki et al. | |
| 5,893,633 A | * 4/1999 | Uchio et al. | 362/244 |
| 6,086,218 A | 7/2000 | Robertson | |
| 6,206,541 B1 | 3/2001 | Landamia | |
| 6,283,613 B1 | * 9/2001 | Schaffer | 362/245 |
| 6,305,818 B1 | 10/2001 | Lebens et al. | |
| 6,357,893 B1 | 3/2002 | Belliveau | |
| 6,386,730 B1 | 5/2002 | Matthews | |
| 6,474,837 B1 | 11/2002 | Belliveau | |
| 6,485,160 B1 | 11/2002 | Sommers et al. | |
| 6,488,390 B1 | 12/2002 | Lebens et al. | |
| 6,491,409 B1 | * 12/2002 | Sharrah et al. | 362/206 |
| 6,523,972 B2 | 2/2003 | Sharrah et al. | |
| 2002/0021573 A1 | 2/2002 | Zhang | |
| 2002/0093818 A1 | 7/2002 | Mele | |
| 2002/0149928 A1 | 10/2002 | Watterson et al. | |
| 2002/0191396 A1 | 12/2002 | Reiff et al. | |
| 2002/0196620 A1 | 12/2002 | Sommers et al. | |
| 2003/0007346 A1 | * 1/2003 | Cooper et al. | 362/184 |
| 2003/0095408 A1 | * 5/2003 | Opolka | 362/241 |

OTHER PUBLICATIONS

Lightwave LED Flashlights, B&A Products, Aug. 20, 2002, www.baproducts.com/lightwav.
Global Sources, LED lights/cluster lamps, www.global-sources.com/General Manager.

* cited by examiner

Primary Examiner—Thomas M. Sember
Assistant Examiner—Hargobind S Sawhney
(74) Attorney, Agent, or Firm—Barlow, Josephs & Holmes, Ltd.

(57) ABSTRACT

The present invention discloses unique flashlight head construction that includes an array of lighting elements individually arranged in a corresponding array of reflector cups. Each lighting element in the flashlight head of the present invention is individually contained within a single reflector cup that both collects and directs the emitted light while protecting the lighting element from damage. Further, the present invention provides a unique structure that facilitates the sealing of the flashlight head to enhance the manufacture of a durable and waterproof flashlight.

24 Claims, 4 Drawing Sheets

FLASHLIGHT HEAD WITH ISOLATED LIGHTING ELEMENTS

PRIORITY CLAIM TO EARLIER FILED APPLICATION

This application claims priority from U.S. patent application Ser. No. 10/080,164, filed Feb. 21, 2002, which claims priority from earlier filed U.S. Provisional Patent Application No. 60/270,657, filed Feb. 22. 2001.

BACKGROUND OF THE INVENTION

The present invention relates to a novel flashlight head construction. More specifically, this invention relates to a flashlight head construction wherein the lighting elements of the flashlight are each individually isolated and contained in separate reflector cups to provide protection for the lighting elements and to facilitate the sealing of the flashlight head.

Flashlights of varying sizes and shapes are well known in the art. A number of such designs are known that utilize two or more batteries as their source of electrical energy, carried in series in a tubular body, where the tubular body also serves as a handle for the flashlight. Typically, an electrical circuit is established from one terminal of the battery, through a conductor to an external switch and then through another conductor to one contact of a bulb. After passing through the filament of the bulb, the electrical circuit emerges through a second contact of the bulb in electrical contact with a conductor, which in turn is in electrical contact with the flashlight housing. The flashlight housing provides an electrically conductive path to the other terminal at the rear of the battery. Actuation of the external switch completes the electrical circuit enabling electrical current to pass through the filament of the bulb, thereby generating light that is then typically focused by a reflector to form a beam of light.

In general, these flashlight switch mechanisms operate in two basic manners. The first mechanism is a pushbutton type switch on the side or bottom of the light. The user depresses the switch, which locks into the engaged position, turning the flashlight on. To turn the light off, the user again depresses the switch, unlocking it and turning the light off. Often, if a watertight seal is desired, a rubberized material is installed into the body of the flashlight as a covering over the switch mechanism. This design has several drawbacks. One drawback is that the increased number of parts creates additional assembly steps and increases the difficulty of assembly process. Another drawback is the possibility of leaks developing as the rubber membrane wears out from the stretching action resulting from continuous use.

In an attempt to resolve the drawbacks noted above with respect to the pushbutton type switches, a second type of rotatable switch was developed for in-line use in flashlights. In one design, an end cap is rotatably secured to the flashlight body. To establish the required electrical contact, the end cap is rotated making contact to illuminate the lamp bulb. A number of such prior art designs feature rotatable end caps which are rotated to move the batteries longitudinally within the flashlight body towards the lamp bulb, thereby causing contact between the battery contact and the base contact of the lamp bulb. In the open position, the battery is typically spring biased away from the base contact of the bulb.

In other designs, miniature flashlights have been designed where the rotatable switch is located in the reflector end of the flashlight body. The lamp bulb is located within an insulated receptacle at the reflector end of the flashlight with one or more conductive pins being rotatably aligned by movement of the switch portion of the device to establish electrical contact. While these switch mechanisms are internal to the device and thus less subject to damage, they are overly complicated in design and more costly to manufacture and require higher assembly tolerances.

In addition, the types of switches described above all generally operate in a forward direction, meaning that as the user turns the head or tail of the flashlight, tightening it onto the body of the flashlight, switch contact is eventually made thereby turning the flashlight on. Electrical contact, in this type of switch, is achieved by bringing a spring contact on the inside of the flashlight into contact with one pole of the battery contained within the body. These types of switches are problematic because the components of the flashlight are not always firmly holding the batteries in place. For example, when the flashlight is in the off position, the head is generally partially unscrewed from the body of the flashlight, preventing the spring on the back of the head from contacting the battery. This arrangement, however, also prevents the battery from being restrained, allowing the battery to freely float within the flashlight body. In addition, the range of switch contact is very limited, thus providing a very low tolerance switch mechanism that does not operate smoothly.

There is also further difficulty in providing a seal for prior art flashlights that attempt to incorporate several LED lighting elements in an array. Generally, this type configuration is placed into a traditional parabolic reflector cup with multiple holes provided in the rear thereof. In these cases, multiple lighting sources are being provided at several locations within the reflector cup. Since reflectors of this type are specifically designed to capture and direct light from a single point source located at or near their optical center, their operation with several off axis light sources is less than desirable. The method of sealing this type of assembly is typical in the prior art where a lens is provided between two gasket elements. In this assembly, the flashlight head, lens and gaskets are all susceptible to damage that could lead to leakage and failure of the flashlight.

It is therefore and object of the present invention to provide an improved flashlight assembly that is entirely self contained and completely waterproof. It is a further object of the present invention to provide a head assembly for a flashlight that has improved operating characteristics, such as enhanced light reflection and an integrally sealed construction. It is yet another object of the present invention to provide an in-line flashlight assembly that is completely enclosed within the body of a flashlight thereby eliminating the possibility of contamination and damage from external forces while containing the lighting elements in individual reflector cups.

SUMMARY OF THE INVENTION

In this regard, and in furtherance of the above stated objectives, the present invention provides a unique flashlight head construction that is fully integrated into a flashlight assembly to provide a completely self contained and waterproof lighting assembly. The present invention further provides a flashlight head assembly that isolated each of the lighting elements from one another in individual reflector cups to enhance the efficiency of the flashlight head while facilitating the sealing of the assembly. This is in contrast to the above-described flashlights that generally group several LED's into a single modified parabolic reflector cup that relies on a lens and gasket assembly for waterproofing. This manner of operation allows the present invention to provide an extended operational range with a high level of usable light output and a positive sealing.

The basic structure of the flashlight includes a head portion with an outer housing to enclose several of the critical operable elements of the flashlight. Specifically the outer housing includes several tapered openings in the front end thereof that correspond to an array of lighting elements. The output end of the lighting elements are seated within rear of the tapered openings with the head of the lighting element extending into tapered cavity. The leads of the lighting elements are mounted onto a mounting board that is also housed within the outer housing thereby providing electrical connectivity to the array of lighting elements. The taper of the walls of the openings in the outer housing effectively operate as a small reflector for the lighting element contained therein, capturing and directing the light output from the lighting element towards the front of the flashlight thereby increasing the light output of the flashlight assembly.

To facilitate sealing of the flashlight head assembly a sealant material is provided in the cavity between the circuit board and the lighting elements within the outer housing. The sealant material fully fills the cavity providing a completely sealed head assembly for incorporation into a flashlight device.

Other objects, features, operational details and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
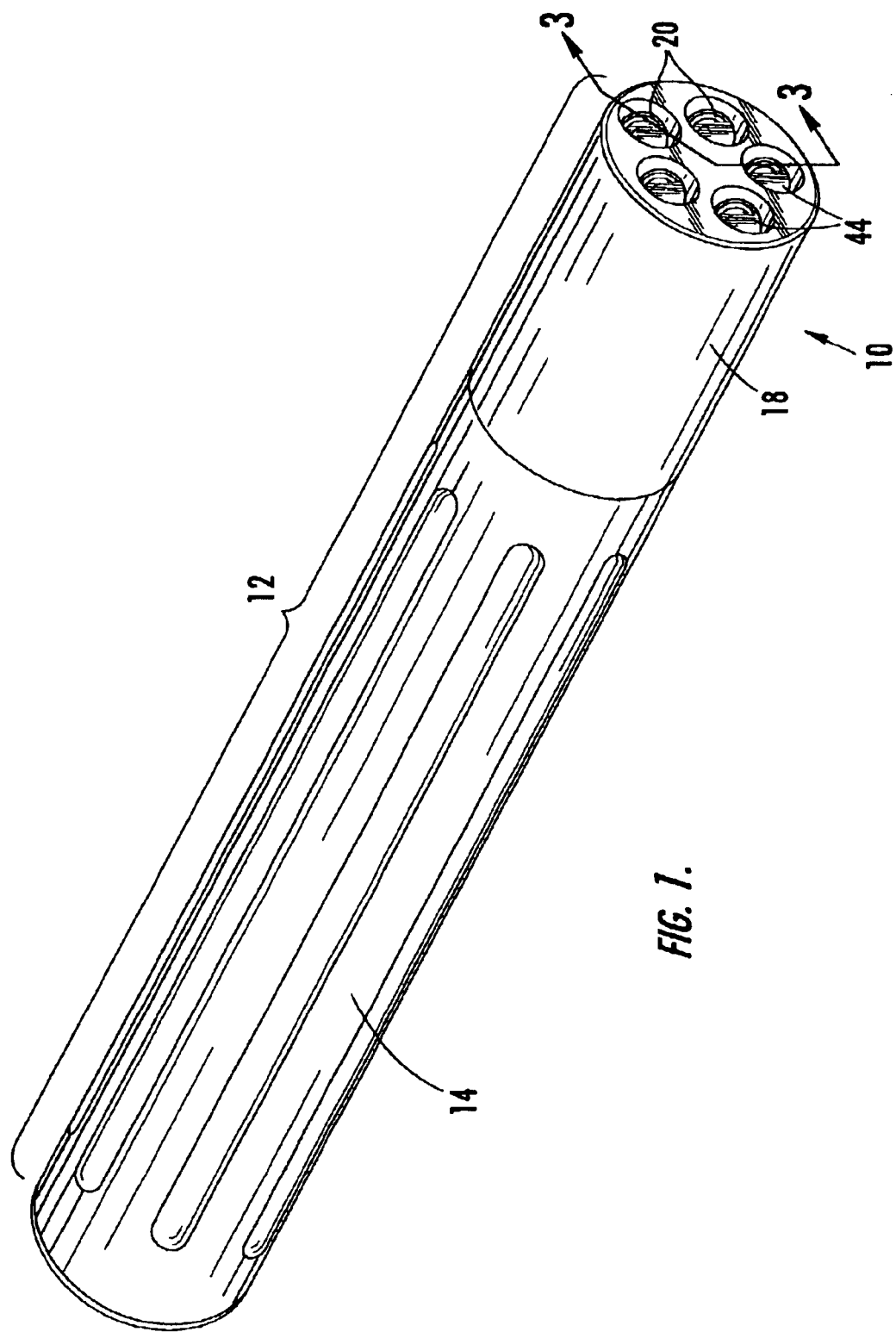
FIG. 1 is a perspective view of a flashlight containing the reverse operating switch mechanism of the present invention.

Referring now to the drawings, a completed flashlight assembly incorporating the reverse-acting switch mechanism of the present invention is generally indicated at 12 in FIGS. 1–3a. While the reverse switch mechanism is shown incorporated into a flashlight in the description of the preferred embodiment, the present disclosure provides that the switch mechanism described can be incorporated into a variety of other devices that require an inline switch having the same or similar operational characteristics. As will hereinafter be more fully described, the present invention provides a fully contained waterproof inline flashlight switch that provides improved operating features, higher durability and easier assembly as compared to similar flashlights in the prior art. The entire assembly is contained in a simple housing to provide a useful, novel and improved light source.

The flashlight 12 generally includes an elongated housing 14, batteries 16 disposed in the housing 14, and a flashlight head portion 10.

The flashlight head 10 has an outer enclosure 18 that at least partially encloses at least one light emitting diode (LED) 20, and a circuit component 22, as well as the reverse switch assembly.

Figure 2:
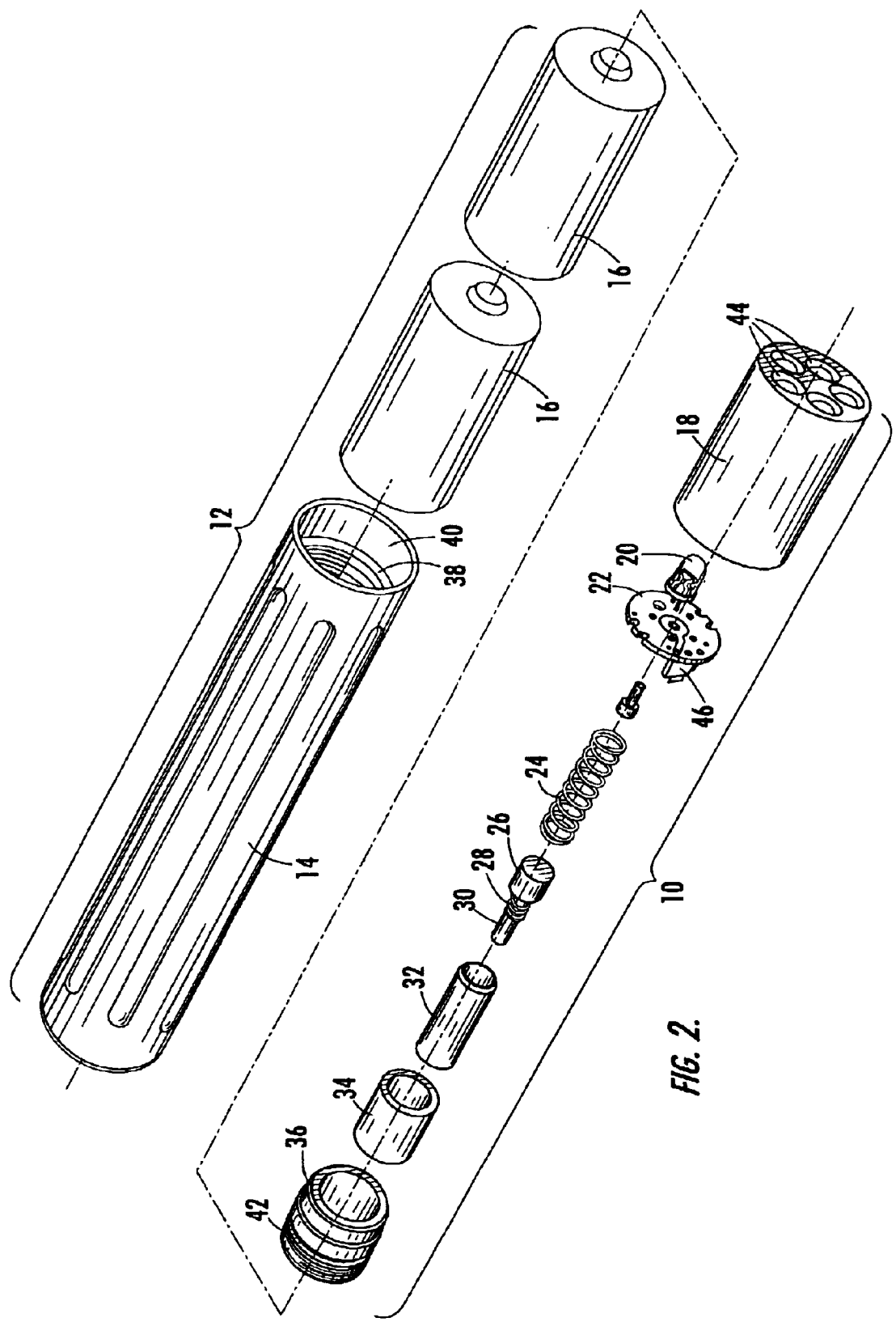
FIG. 2 is an exploded perspective view thereof.

The reverse switch assembly is best shown in FIG. 2, and includes a spring 24, an insulator disk 26, a contact spring 28, a plunger 30, a contact tube 32, and a switch housing 34. The flashlight head 10 further includes a lower enclosure 36 assembled in a permanent fashion to the outer enclosure 18 to enclose both the switching assembly and light source 20 of the flashlight 12 inside the flashlight head 10.

Turning to FIG. 1 an assembled view of the flashlight 12 of the present invention is shown. The outer shape of the flashlight 12 is formed by the battery housing 14 and the outer enclosure 18 of the flashlight head 10 where the battery housing 14 also serves as the handle for the flashlight 12. Both the battery housing 14 and the outer enclosure 18 are formed of a metallic material such as milled aluminum or stainless steel. This allows both of these components to be electrically conductive and employed as components of the overall circuitry of the flashlight 12 as will be further described below.

FIG. 2 shows the flashlight 12 and the flashlight head 10 of the present invention in an exploded perspective view, illustrating the general relationship between all of the components in the overall device. The battery housing 14 is generally tubular in shape having a closed bottom and an open top. The battery housing 14 is generally hollow with an opening 38 that is of a diameter particularly suited to receive batteries 16. In the preferred embodiment, the battery housing 14 is shown of a dimension to accept two batteries 16, however, the present invention will operate equally well using one, three, four or more batteries 16 and the length of the battery housing 14 will be adjusted accordingly to accommodate the number of batteries 16 used. The inner surface of the open end 38 of the battery housing 14 has female threads 40 that are designed to engage corresponding male threads 42 on the lower enclosure 36 thereby maintaining the flashlight 12 in an assembled condition and allowing the head portion 10 to be rotated relative to the battery housing 14. Rotation of the head 10 relative to the housing 14 selectively adjusts the relative positions to one another. When the batteries 16 are installed into the battery housing 14 one contact of the battery 16 is in electrical communication with the bottom of the battery housing 14. Since the battery housing 14 is metallic, electricity is therefore conducted from the battery 16 contact, through the bottom of the battery housing 14 and up through the battery housing 14 into the flashlight head 10 as will be further described below.

The head 10 portion of the flashlight 12 has an outer enclosure 18 that receives and houses all of the switching components and the light source of the flashlight. The outer enclosure 18 is also formed of a machined metallic material that is electrically conductive, such as machined aluminum or stainless steel. The outer enclosure 18 is cylindrically shaped, having an opening at one end into which all of the remaining components are installed and several smaller openings 44 at the other end through which the installed LED lamps 20 protrude. Circuit assembly 22 is typically a printed circuit board onto which the LED lamps 20 are mounted. The circuit assembly 22 has circuit traces connecting one pole of each LED 20 to a metal connection tab 46 and the other pole of each LED 20 to a central connection point 52 on the bottom surface of the circuit assembly 22. Once the LED lamps 20 are installed onto the circuit assembly 22, it is slid into the opening in the outer enclosure 18, so that the LED lamps 20 protrude through the openings 44 in the outer enclosure 18. The connection tab 46 is in electrical communication with the wall of the outer enclosure 18, thereby completing a path of electrical conductivity from the first contact of battery 16, through the battery housing 14 up into the outer enclosure 18 of the head and into the circuit assembly 22 through connection tab 46. The remaining portion of the electrical circuit is completed through the switch components as will be discussed below. In addition to providing paths of conductivity to each of the LED lamps 20, the circuit assembly 22 may also include additional circuitry for controlling the flow of current through the LED lamps 20 or to provide additional functionality, such as flashing, to the flashlight 12.

The principal component of the switch mechanism is plunger 30. The plunger 30 is substantially cylindrical and formed from a metallic material such as machined brass. One end of the plunger 30 is in contact with the second contact end of the battery 16 when the flashlight 12 is fully assembled. The opposite end of the plunger has a raised shoulder 48. The raised shoulder 48 serves to retain contact spring 28 in an operative position on the plunger 30. During assembly, the contact spring 28 is slid onto the plunger 30 and is pressed onto the raised shoulder 48 so that the spring is frictionally retained and in firm electrical communication with the plunger 30. Further, insulator disk 26 is attached to the end of the plunger 30 opposite the battery 16 contact. This sub-assembly (plunger 30, contact spring 28 and insulator disk 26) is then slid into contact tube 32.

Contact tube 32 is a cylindrically shaped tube that is open on the top end and has a bottom wall. The bottom wall has an opening 54 that has a diameter slightly greater than the diameter of the plunger 30. The remaining portion of the bottom wall forms switch contact 50. The plunger 30, contact spring 28 and insulator disk 26 are slid into the open end of the contact tube allowing the contact end of the plunger to protrude through the opening 54 in the bottom wall of the contact tube 32 without making physical or electrical contact with switch contact 50. In this regard, the insulator disk 26 is sized to have a diameter that is only slightly smaller than the diameter of the contact tube 32. This allows the insulator disk 26 to slide freely up and down inside the contact tube 32 while supporting the plunger 30 in the center of the contact tube 32 and preventing the plunger 30 from contacting the sides of the contact tube 32. The insulator disk 26 is formed from a non-conductive material and is preferably a plastic material. Biasing spring 24 is then installed into the contact tube 32 behind the insulator disk 26. The biasing spring 24 has a diameter that is also only slightly smaller than the inner diameter of the contact tube 32 and is in electrical communication with the inner walls of contact tube 32 and with the central connection point 52 on the circuit assembly 22 when the entire flashlight head 10 is assembled. The contact tube 32 including the switch components described above is installed into the switch housing 34, which consists of cylindrical support housing that is electrically insulative and designed to isolate contact tube 32 from the rest of the flashlight head assembly 10.

The switch housing 34, after the above described assembly, is then placed into the lower enclosure 36. The lower enclosure 36 is a metallic component having an opening in its center into which the entire switching assembly is placed. The lower enclosure has an opening in its center to allow the plunger 30 to protrude and contact the battery 16 in an assembled position. The lower enclosure 36 also has male threads 42 that correspond to the female threads 40 on the interior of the battery housing 14. To complete the assembly of the head 10, the lower enclosure 36 containing all of the switching components, is pressed into the outer enclosure 18 using a hydraulic press (not shown) or similar method known in the art. This provides a completed flashlight head 10 that is sealed, having no parts that are accessible by the user. The head 10 is then threaded into the battery housing 14, which already contains batteries 16 to complete the assembly of the flashlight 12. To further seal the flashlight assembly 12 and prevent water infiltration, an O-ring gasket 56 is provided in a groove 58 in the side of lower enclosure 36. The O-ring gasket 56 serves to seal the operable junction between the flashlight head 10 and the battery housing 14 prevent infiltration of water or other contaminants. Additionally, sealant 60 in the form of a UV curable potting compound is installed in the gap between the LED lamps 20 and the openings 44 in the outer enclosure 18 to further prevent infiltration to the interior of the flashlight 12.

Figure 3:
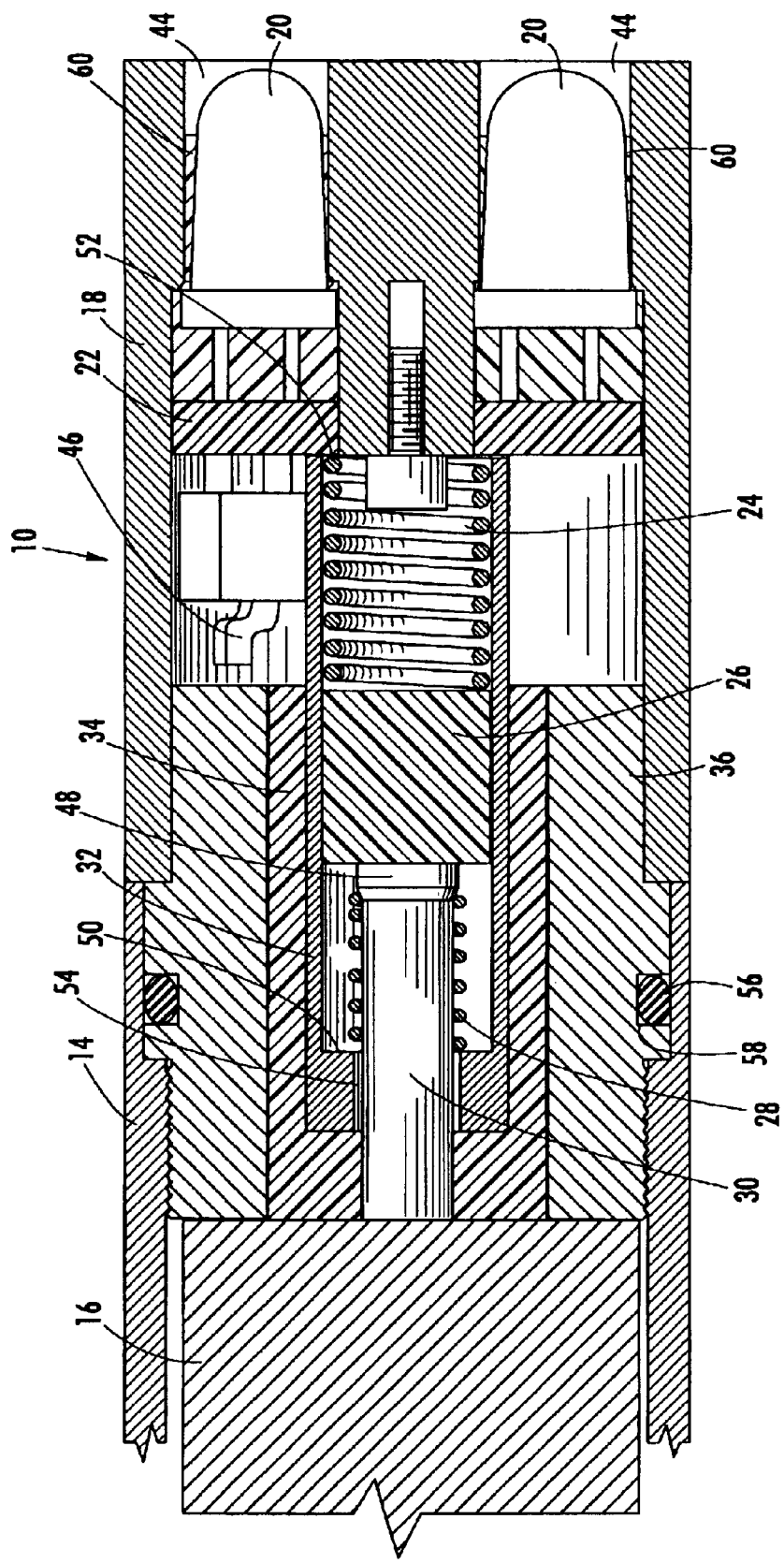
FIG. 3 is a cross-sectional view of the flashlight of the present invention in FIG. 1 along the section line 3—3 in the normally open, off position.
Figure 3A:
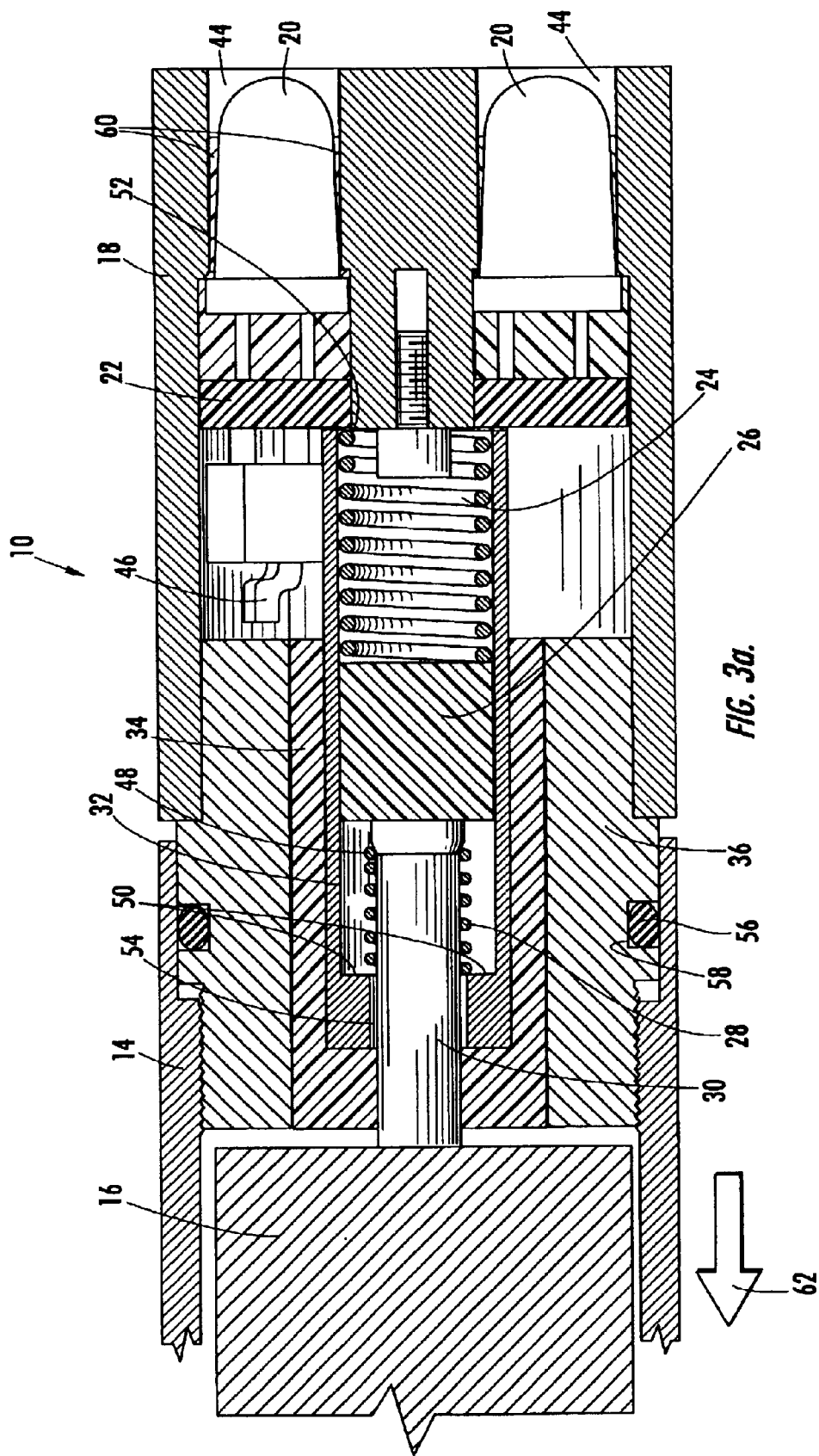
FIG. 3a is a cross-sectional view of the flashlight of the present invention in FIG. 1 along the section line 3—3 in the closed, on position.

Turning to FIGS. 3 and 3a a section is shown of the flashlight 12 of the present invention in the operational state. FIG. 3 shows the flashlight 12 in the normally open, off state, and FIG. 3a shows the flashlight 12 in the closed, on state. In FIG. 3 the flashlight head 10 is shown threaded completely into the battery housing 14. In this state, as can be seen, there is a gap between contact spring 28 and the bottom surface of the switch contact 50. This gap is a break in the electrical circuit of the flashlight 12 and prevents the batteries 16 from energizing the LED lamps 20. While plunger 30 is spring biased by the force of spring 24 in the direction of the batteries 16, it is not allowed to move in the direction of the batteries 16 because of the proximity of the batteries 16 to the flashlight head 10. In other words, when the flashlight head 10 is screwed entirely onto the battery housing 14, the batteries 16 force the plunger upwardly against spring 24. Because the spring 28 is connected to the top of the plunger, the contact spring 28 is moved out of electrical contact with the bottom of the contact tube 50.

In FIG. 3a, the battery housing 14 is shown as being slightly unscrewed from the flashlight head 10 as indicated by the arrow 62, or vice versa, the head 10 is unthreaded from the body 14. This displacement of the battery housing 14 results in displacement of the batteries 16 from the flashlight head 10 by the same distance. Since the plunger 30 is spring biased in the direction of the batteries 16 by spring 24, this linear displacement of the batteries 16 allows the spring 24 to expand and thus displace the plunger 30 rearwardly by the same distance as the battery housing 14 and the batteries 16. Once the distance of displacement of the plunger 30 is sufficient, the contact spring 28 comes into contact with switch contact 50. When this contact is made it can be seen that a complete electrical circuit is provided starting at the top battery 16 contact through the plunger 30, the contact spring 24, switch contact 50, contact tube 32, secondary spring 24, central contact 52, into the circuit assembly 22 and the LED lamps 20, through contact tab 46, back into the outer housing 18, through the lower housing 36, into the battery housing 14 and finally to the bottom contact of battery 16. Therefore, by translating the battery housing 14 in a rearward direction 62 from the flashlight head 10 an electrical circuit is completed thereby energizing the flashlight 12.

It can also be seen in FIG. 3a that at the point where contact spring 28 initially contacts switch contact 50, the contact spring 28 is not compressed. Since the spring force in the secondary spring 24 is greater than the spring force in the contact spring 28, further displacement of the battery housing 14 and batteries 16 in the rearward direction 62 allows the plunger 30 to also be further displaced in the rearward direction 62. As the plunger 30 is further displaces by secondary spring 24, contact spring 28 is further compressed allowing the plunger 30 to remain in contact with the battery 16 until the contact spring 28 is completely compressed. The use of the contact spring 28 and secondary spring 24 in this manner provide for the extended operational range provided for under the present invention.

It can therefore be seen that the instant invention provides a compact inline flashlight switching mechanism that is fully enclosed and sealed against infiltration of water of other contaminants. It can be further seen that the present invention provides a novel reverse acting switch design that provides for smooth operation and an extended operational range through the use of spring contacts. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A lensless head assembly for an LED light comprising:
   a tubular enclosure including,
      a tubular side wall, and
      an end wall, wherein inner surfaces of said end wall and said side wall cooperate to define an open end of said enclosure and a cavity therein, said end wall having at least one inwardly extending aperture;
   a circuit board having an inner surface received in said open end of said enclosure, said inner surfaces of said circuit board, said side wall and said end wall cooperating to define a substantially enclosed interior cavity within said tubular enclosure;
   at least one LED mounted on said inner surface of said circuit board, said at least one LED being slideably received within said at least one aperture in said end wall, wherein said aperture and said LED are exposed to the exterior environment; and
   a sealant substantially entirely filling said enclosed interior cavity, such that contaminants cannot enter into said enclosed interior cavity through said at least one aperture in said end wall.

2. The head assembly of claim 1, wherein said at least one aperture in said end wall includes aperture walls that are inwardly tapered.

3. The head assembly of claim 1, wherein said at least one aperture in said nd wall is a reflector cup.

4. The head assembly of claim 1, further comprising:
   a plurality of LED's mounted on said mounting board, said and wall including a like plurality of inwardly extending apertures to slideably receives said plurality of LED's.

5. The head assembly of claim 4, wherein said plurality of apertures in said end wall each include aperture walls that are inwardly tapered.

6. The head assembly of claim 5, wherein said plurality of LED's are arranged in a circular array and said plurality of apertures in said end wall are also arranged in a circular array corresponding to said circular array of LED's.

7. The head assembly of claim 4, wherein said plurality of apertures in said end wall are a plurality of reflector cups.

8. The head assembly of claim 7, wherein said plurality of LED's are arranged in a circular array and said plurality of apertures in said end wall are also arranged in a circular array corresponding to said circular array of LED's.

9. A head assembly for an LED light consisting of:
   a tubular enclosure including,
      a tubular side wall, and
      an end wall, wherein Inner surfaces of said end wall and said side wall cooperate to define an open end of said enclosure, said end wall having at least one inwardly extending aperture;
   a mounting board received in said open end of said enclosure; and
   at least one LED mounted on said mounting board, said at least one LED being slideably received within said at least one aperture in said end wall.

10. The head assembly of claim 9, wherein said at least one aperture in said end wall includes aperture walls that are inwardly tapered.

11. The head assembly of claim 9, wherein said at least one aperture in said end wall is a reflector cup.

12. The head assembly of claim 9, further consisting of:
   a plurality of LED's mounted on said mounting board, said end wall including a like plurality of inwardly extending apertures to slideably receive said plurality of LED's.

13. The head assembly of claim 12, wherein said plurality of apertures in said end wall each include aperture walls that are inwardly tapered.

14. The head assembly of claim 13, wherein said plurality of LED's are arranged in a circular array and said plurality of apertures in said end wall are also arranged in a circular array corresponding to said circular array of LED's.

15. The head assembly of claim 12, wherein said plurality of apertures in said end wall are a plurality of reflector cups.

16. The head assembly of claim 15, wherein said plurality of LED's are arranged in a circular array and said plurality of apertures in said end wall are also arranged in a circular array corresponding to mid circular array of LED's.

17. The head assembly of claim 9, wherein said mounting board comprises a circuit board having contact leads thereon, and further wherein said at least one LED includes spaced lads that are mounted on said circuit board in electrical communication with said contact leads.

18. The head assembly of claim 9 further consisting of
   an inner surface on said mounting board and said inner surfaces of said: mounting board, said side wall and said end wall cooperate to define a substantially enclosed interior cavity within said tubular enclosure; and
   a sealant substantially entirely filling said enclosed interior cavity such that contaminants cannot enter into said enclosed interior cavity through said at least one aperture in said end wall.

19. A head assembly for an LED light comprising:
   a tubular enclosure including,
      a tubular side wall having inner and outer surfaces,
      an end wall having an inner and outer surface, wherein said inner surface of said end wall and said side wall cooperate to define an open end of said enclosure and said outer surfaces of said end wall and said side wall cooperate to form an outer surface of said assembly, and
      at least one inwardly extending bore in said end wall, said bore having a side wall which is integrally merged with said outer surface of said end wall;

a mounting board received in said open end of said enclosure; and at least one LED mounted on said mounting board, said at least one LED being slideably received within said at least one bore in said end wall such that said LED is exposed to the exterior environment surrounding said assembly.

20. The head assembly of claim 19, wherein said side wall of said at least one bore is inwardly tapered.

21. The head assembly of claim 19, further comprising:

a plurality of LED's mounted on said mounting board, said end wall including a like plurality of inwardly extending bores to slideably receive said plurality of LED's.

22. The head assembly of claim 21, wherein said plurality of LED's are arranged in a circular array and said plurality of bores in said end wall are also arranged in a circular array corresponding to said circular array of LED's.

23. The head assembly of claim 19, wherein said mounting board comprises a circuit board having contact leads thereon, and further wherein said at least one LED indudes spaced leads that are mounted on said circuit board in electrical communication with said contact leads.

24. The head assembly of claim 19 further comprising:

an inner surface on said mounting board and said inner surfaces of sad mounting board, said side wall and said end wail cooperate to define a substantially enclosed interior cavity within said tubular enclosure; and a sealant substantially entirely filling said enclosed interior cavity, such that contaminants cannot enter into said enclosed interior cavity through said at least one aperture in said end wall.

* * * * *